US 10,684,646 B2

(12) United States Patent
Wang et al.

(10) Patent No.: US 10,684,646 B2
(45) Date of Patent: Jun. 16, 2020

(54) HEAD-MOUNTED RESILIENT AUXILIARY LOCKING MECHANISM AND HEAD-MOUNTED DISPLAY

(71) Applicant: GOERTEK TECHNOLOGY CO.,LTD., Qingdao (CN)

(72) Inventors: Liang Wang, Qingdao (CN); Bin Jiang, Qingdao (CN); Xiaoyu Chi, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/292,547

(22) Filed: Mar. 5, 2019

(65) Prior Publication Data
US 2019/0196536 A1 Jun. 27, 2019

Related U.S. Application Data

(63) Continuation-in-part of application No. 16/322,770, filed as application No. PCT/CN2016/114054 on Dec. 31, 2016.

(51) Int. Cl.
  *G06F 1/16* (2006.01)
  *G06F 3/01* (2006.01)
  *A42B 3/14* (2006.01)

(52) U.S. Cl.
  CPC .............. *G06F 1/163* (2013.01); *G06F 3/011* (2013.01); *A42B 3/145* (2013.01); *Y10T 24/2187* (2015.01)

(58) Field of Classification Search
  CPC ..... A42B 3/145; A42B 3/122; Y10T 24/2187; Y10T 24/21
  (Continued)

(56) References Cited

U.S. PATENT DOCUMENTS 6,760,927 B2 * 7/2004 Guay ..................... A42B 3/145
                                                    2/418
7,707,695 B2 * 5/2010 Dubois .................. A42B 3/145
                                                    2/418
(Continued)

FOREIGN PATENT DOCUMENTS

CN    102402011 A    4/2012
CN    102411210 A    4/2012
(Continued)

OTHER PUBLICATIONS

CNIPA, English translation of First Search Report, dated Mar. 1, 2018 re Chinese Patent Application No. 2016106294493.
(Continued)

*Primary Examiner* — Adam J Waggenspack
(74) *Attorney, Agent, or Firm* — Perry + Currier Inc.

(57) ABSTRACT

A head-mounted resilient auxiliary locking mechanism and a head-mounted display, wherein the mechanism comprises a connecting band (3), a rear housing (1) provided at a rear of the connecting band (3), a locking module (4) provided in the rear housing (1), racks (2) provided at the two ends of the connecting band (3) and inserted into the rear housing (1) to engage with the locking module (4), and a resilient band (7) connected between the connecting band (3) and the rear housing (1); when the locking module (4) locks the racks (2), the resilient band (7) prevents the engaging between the racks (2) and the locking module (4) from loosing; and when the locking module (4) releases the racks (2), the resilient band (7) drives the racks (2) to return. The head-mounted display comprises a display (8) and the head-mounted resilient auxiliary locking mechanism.

20 Claims, 6 Drawing Sheets

(58) Field of Classification Search
USPC .......................................................... 224/181
See application file for complete search history.

(56) References Cited

U.S. PATENT DOCUMENTS

| | | | | |
|---|---|---|---|---|
| 8,578,521 | B2* | 11/2013 | Rogers | A42B 3/08 |
| | | | | 2/417 |
| 8,713,718 | B2* | 5/2014 | Moelker | A42B 3/145 |
| | | | | 2/181 |
| 9,895,280 | B2* | 2/2018 | Ma | A42B 3/324 |
| 2009/0222978 | A1* | 9/2009 | Fang | A42B 3/085 |
| | | | | 2/421 |
| 2012/0056897 | A1 | 3/2012 | Okamoto | |
| 2012/0057228 | A1 | 3/2012 | Okamoto | |
| 2012/0062990 | A1 | 3/2012 | Okamoto | |
| 2012/0069264 | A1 | 3/2012 | Inoue | |
| 2015/0059065 | A1* | 3/2015 | Klotz | A42B 3/145 |
| | | | | 2/418 |
| 2015/0107006 | A1* | 4/2015 | Chen | A42B 3/324 |
| | | | | 2/418 |
| 2016/0250092 | A1 | 9/2016 | Ma et al. | |
| 2019/0293945 | A1* | 9/2019 | Chang | G02B 7/002 |

FOREIGN PATENT DOCUMENTS

| | | |
|---|---|---|
| CN | 103976858 A | 8/2014 |
| CN | 105158924 A | 12/2015 |
| CN | 105661735 A | 6/2016 |
| CN | 106094208 A | 2/2017 |
| CN | 205942103 U | 2/2017 |
| JP | 2012053342 A | 3/2012 |
| WO | 2016005604 A1 | 1/2016 |

OTHER PUBLICATIONS

CNIPA, English translation of Supplementary Search Report, dated Jul. 16, 2018 re Chinese Patent Application No. 2016106294493.

ISA/CN, International Preliminary Report on Patentability (Chapter I) with English Translation, dated Feb. 14, 2019 re PCT International Patent Application No. PCT/CN2016/114054.

ISA/CN, International Search Report and Written Opinion with English Translation, dated May 2, 2017 re PCT International Patent Application No. PCT/CN20161114054.

USPTO, Notice of Allowance and Fees Due, dated Jan. 14, 2020 re U.S. Appl. No. 16/292,547.

* cited by examiner

HEAD-MOUNTED RESILIENT AUXILIARY LOCKING MECHANISM AND HEAD-MOUNTED DISPLAY

CROSS REFERENCE TO RELATED APPLICATIONS

This is a Continuation-in-Part Application of U.S. patent application Ser. No. 16/322,770, which is a United States national stage application under 35 U.S.C. § 371 of International Application No. PCT/CN2016/114054 filed on Dec. 31, 2016, which was published under PCT Article 21(2) and which claims priority to Chinese Patent Application No. 201610629449.3, filed on Aug. 2, 2016. The disclosure of the priority applications are hereby incorporated herein in their entirety by reference.

TECHNICAL FIELD

The present disclosure relates to a head-mounted device, and particularly relates to a head-mounted resilient auxiliary locking mechanism and a head-mounted display.

BACKGROUND

The head-wearing locking mechanisms of the current head mounted virtual reality products mostly employ the binding belt type and the gear rack type. The binding belt type locking mechanisms are mainly formed by a loosen buckle and a connecting band. In operation, firstly the proper head wearing spacing is regulated by using the loosen buckle, and then the product can be worn. The gear rack type locking mechanisms are mainly formed by a rack and gear assembly, and the controllable regulating of the head wearing spacing is realized by the engaging and self-locking between the gear and the rack.

SUMMARY

Some embodiments of the present disclosure employ the following technical solution:

a head-mounted resilient auxiliary locking mechanism, wherein the mechanism comprises a connecting band, a rear housing provided at a rear of the connecting band, a locking module provided in the rear housing, racks provided at the two ends of the connecting band and inserted into the rear housing to engage with the locking module, and a resilient band connected between the connecting band and the rear housing; when the locking module locks the racks, the resilient band prevents the engaging between the racks and the locking module from loosing; and when the locking module releases the racks, the resilient band drives the racks to return.

A head-mounted display, comprises a display and a head-mounted resilient auxiliary locking mechanism, the head-mounted resilient auxiliary locking mechanism is provided with a connecting band, a front part of the connecting band is connected to two sides of the display, and a rear housing is provided at a rear of the connecting band; and a locking module is provided in the rear housing, two ends of the connecting band connected to the rear housing have racks, and the racks are inserted into the rear housing to engage with the locking module; a resilient band is connected between the connecting band and the rear housing; when the locking module locks the racks, the resilient band prevents the engaging between the racks and the locking module from loosing; and when the locking module releases the racks, the resilient band drives the racks to return.

Figure 1:
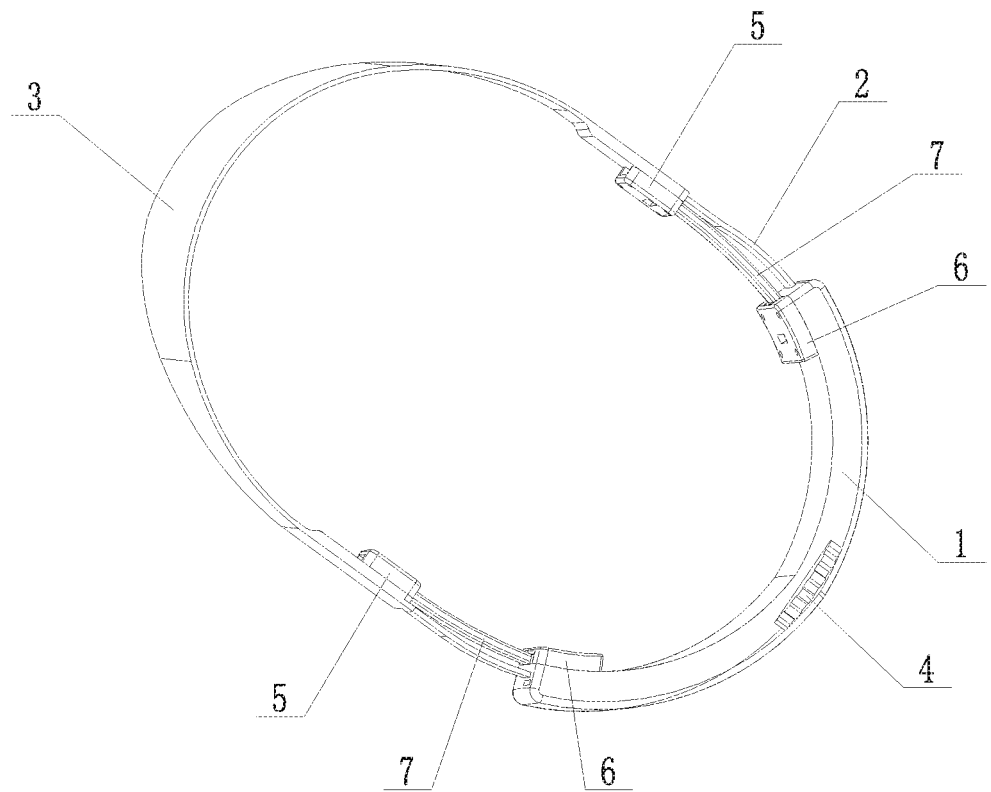
FIG. 1 is a perspective view of a head-mounted resilient auxiliary locking mechanism according to some embodiments of the present disclosure.

In the drawings: 1. rear housing; 2. rack; 3. connecting band; 4. locking module; 4-1. dial wheel; 4-2. rack; 4-3. pawl; 4-4. transmission gear; 4-5. ratchet; 4-6. rack; 4-7. button; 4-8. transmission shaft; 4-9. clutching gear; 4-10. bracket; 5. front buckle; 5-1. mounting hole; 5-2. clipping hole; 5-3. receiving slot; 6. rear buckle; 6-1. mounting hole; 6-2. clipping hole; 6-3. receiving slot; 7. resilient band; 7-1. claw; 7-2. connecting terminal; and 8. display.

DETAILED DESCRIPTION

The disadvantages of current binding belt type locking mechanisms may include: (1) the head-wearing spacing is hard to control; (2) the locking mechanism can not bear large shaking because of the resilience of the connecting band; (3) the life cycle of the connecting band is short; and (4) the wearing comfortableness is poor.

The disadvantages of current gear rack type locking mechanisms may include: (1) the head wearing spacing does not have a margin for elasticity retracting, which causes poor body feeling; (2) the regulating can not revert to original position automatically, which makes the regulating inconvenient; and (3) because of the back lash, the intermittent impacts between the gear and the rack result in decreased usage life.

According to some embodiments, one of the object of the present disclosure is to provide a head-mounted resilient auxiliary locking mechanism and a head-mounted display. A connecting band is provided with a resilient band, to provide resilient pulling forces between the components internal of the locking mechanism, which on one hand realizes the engaged adhesion and jump preventing function, and on the other hand realizes the automatic return function.

In order to make the objects, the technical solutions and the advantages of some embodiments of the present disclosure clearer, the present disclosure will be described below in conjunction with the drawings.

The First Embodiment

FIGS. 1-9 show an embodiment of a head-mounted resilient auxiliary locking mechanism according to some embodiments of the present disclosure. The present embodiment shows a head-mounted resilient auxiliary locking mechanism, wherein the mechanism comprises a connecting band 3, a rear housing 1 provided at the rear of the connecting band 3, a locking module 4 provided in the rear housing 1, racks 2 provided at the two ends of the connecting band 3 and inserted into the rear housing 1 to engage with the locking module 4, and a resilient band 7 is connected between the connecting band 3 and the rear housing 1; when the locking module 4 locks the racks 2, the resilient band 7 prevents the engaging between the racks 2 and the locking module 4 from loosing; and when the locking module 4 releases the racks 2, the resilient band 7 drives the racks 2 to return.

The returning here refers to that the resilient band 7 drives the racks 2 to move until the resilient band 7 is in an un-stressed state, in which it is not tensioned and is not compressed, which may be considered as the starting point of the regulating. When the head-mounted resilient auxiliary locking mechanism is used, it is required to be regulated to fit the size of the head, and after the regulating the resilient band 7 is usually tensioned or compressed. When the resilient band 7 is being tensioned or compressed, the locking module 4 and the racks 2 are engaged and adhered together, which prevents jumping.

Figure 2:
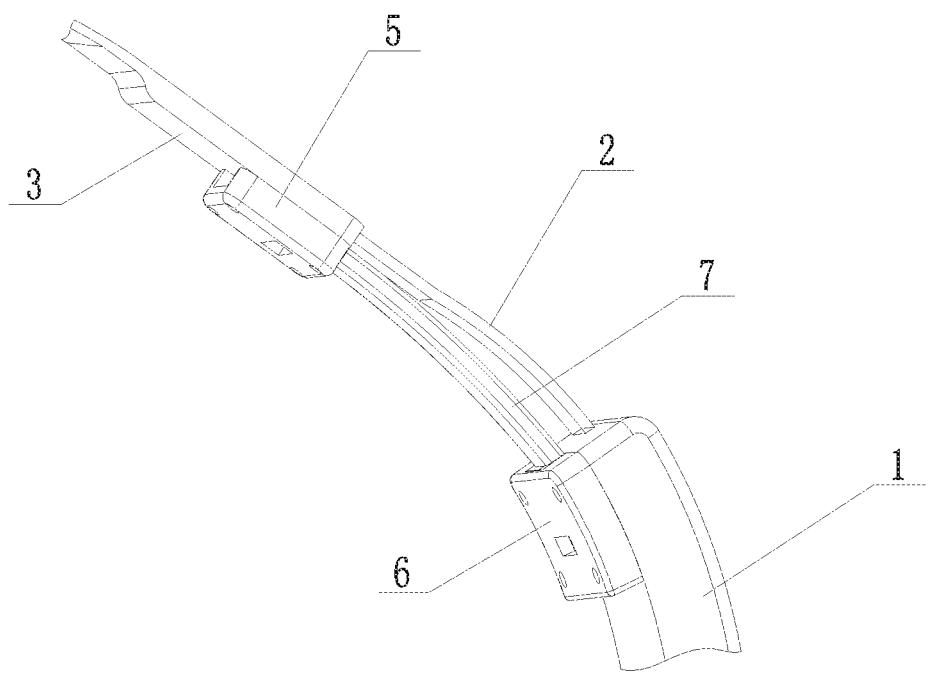
FIG. 2 is a partial enlarged view of FIG. 1.
Figure 3:
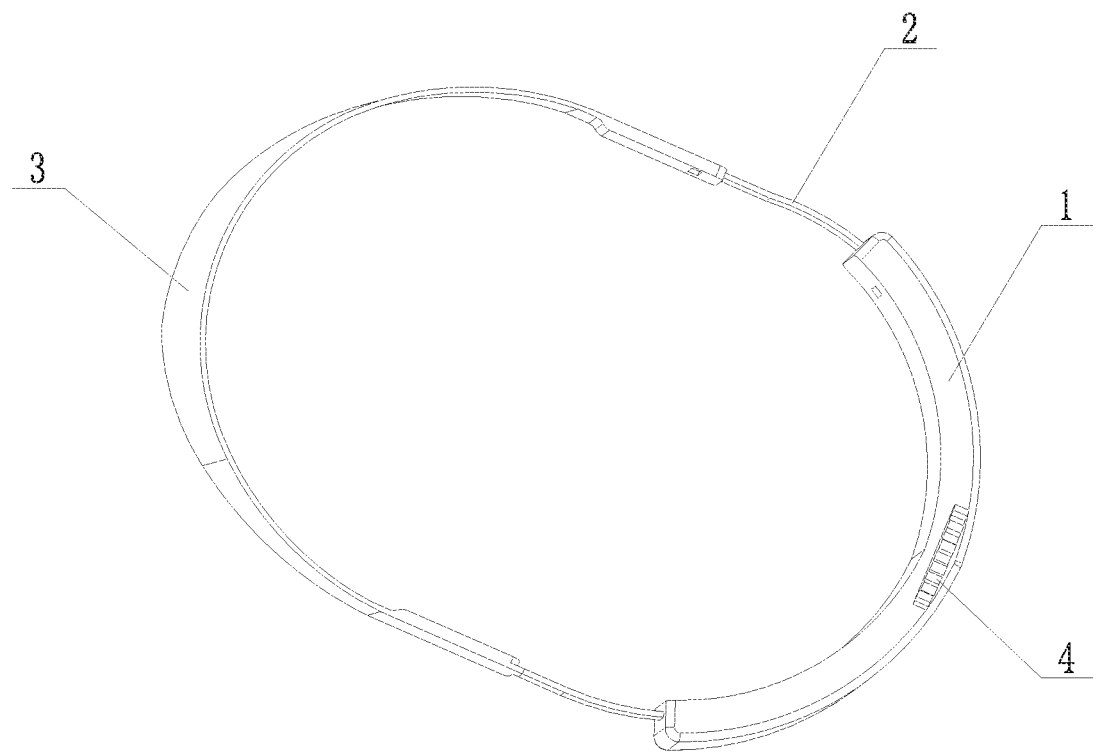
FIG. 3 is a perspective view of a head-mounted resilient auxiliary locking mechanism according to some embodiments of the present disclosure (wherein the buckles and the resilient band are omitted)

In some embodiments, the connecting band 3 itself does not have retractility. The connecting band 3 is made of a material that does not have retractility, for example plastic, and is formed integrally with the racks 2. The resilient band 7 and the racks 2 are provided parallelly between the connecting band 3 and the rear housing 1, and the resilient band 7 is provided on the inner side of the racks 2. As shown in FIGS. 1 and 2, each of the connecting band 3 and the rear housing 1 is fixedly attached with a buckle, i.e., the front buckle 5 and the rear buckle 6 in the drawings, and the front buckle 5 and the rear buckle 6 individually fix one end of the resilient band 7. The resilient band 7 may employ silica gel, and may also employ other materials that have elasticity, such as rubber.

Figure 4:
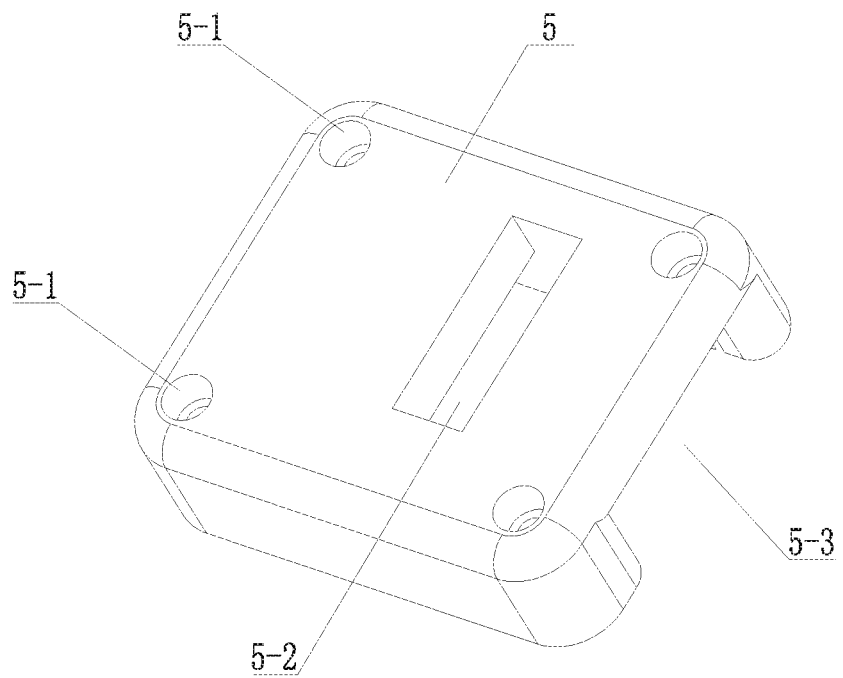
FIG. 4 is a perspective view of a front buckle employed in a head-mounted resilient auxiliary locking mechanism according to some embodiments of the present disclosure.
Figure 5:
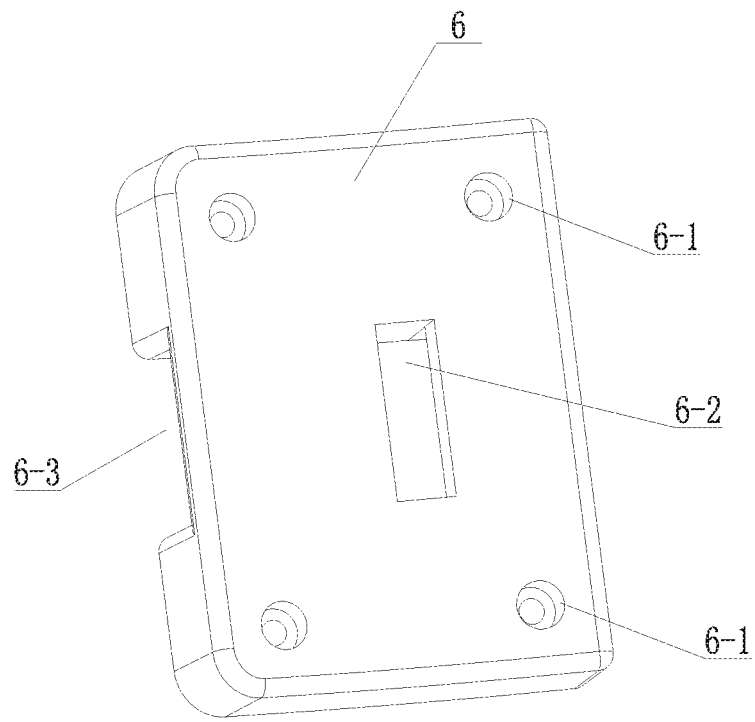
FIG. 5 is a perspective view of a rear buckle employed in a head-mounted resilient auxiliary locking mechanism according to some embodiments of the present disclosure.
Figure 6:
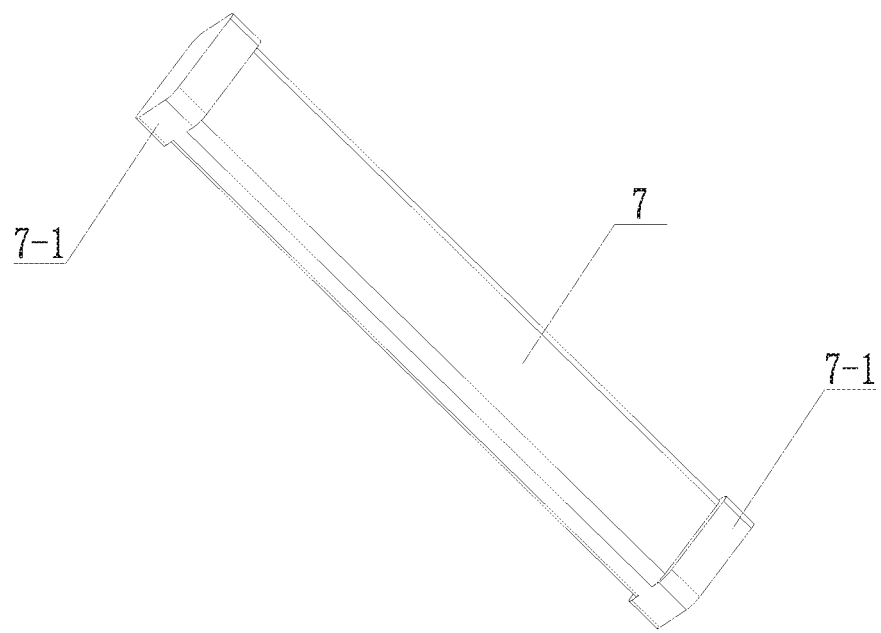
FIG. 6 is a perspective view of a resilient band employed in a head-mounted resilient auxiliary locking mechanism according to some embodiments of the present disclosure.

As shown in FIGS. 4, 5 and 6, each end of the resilient band 7 has a claw 7-1. The central location of the top face of the front buckle 5 is provided with a matching clipping hole 5-2, and the periphery of the top face is provided with mounting holes 5-1; that is, the clipping hole 5-2 and the mounting holes 5-1 are located on the same face of the front buckle 5, and the bottom face opposite to the top face of the front buckle 5 is provided with a receiving slot 5-3. The central location of the top face of the rear buckle 6 is provided with a matching clipping hole 6-2, and the periphery of the top face is provided with mounting holes 6-1; that is, the clipping hole 6-2 and the mounting holes 6-1 are located on the same face of the rear buckle 6, and the bottom face opposite to the top face of the rear buckle 6 is provided with a receiving slot 6-3.

In some embodiments, both of the front buckle 5 and the rear buckle 6 are of a square-stool-shaped structure, wherein the mounting holes 5-1 are located at the four legs of the front buckle 5, and the mounting holes 6-1 are located at the four legs of the rear buckle 6, to ensure the connection strength.

As shown in FIG. 2, the claw 7-1 of one end of the resilient band 7 protrudes into the receiving slot 5-3 of the front buckle 5 and is clip-connected with the clipping hole 5-2 of the front buckle 5, and the claw 7-1 of the other end of the resilient band 7 protrudes into the receiving slot 6-3 of the rear buckle 6 and is clip-connected with the clipping hole 6-2 of the rear buckle 6. At the locations of the mounting holes 5-1 the front buckle 5 is fixed on the connecting band 3 by a screw, and the front buckle 5 is located on the inner side of the connecting band 3; and at the locations of the mounting holes 6-1 the rear buckle 6 is fixed on the rear housing 1 by a screw, and the rear buckle 6 is located on the inner side of the rear housing 1. Accordingly, in the using process of the head-mounted resilient auxiliary locking mechanism, both of the front buckle 5 and the rear buckle 6 are located on the inner side, which ensures the tidiness of the appearance of the product.

Figure 7:
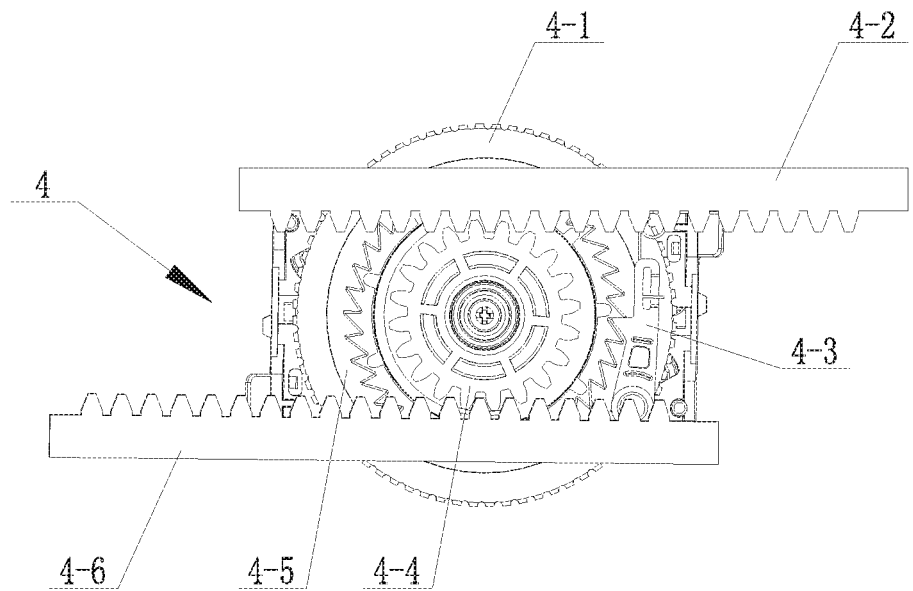
FIG. 7 is a front view of a regulating mechanism employed in a head-mounted resilient auxiliary locking mechanism according to some embodiments of the present disclosure.
Figure 8:
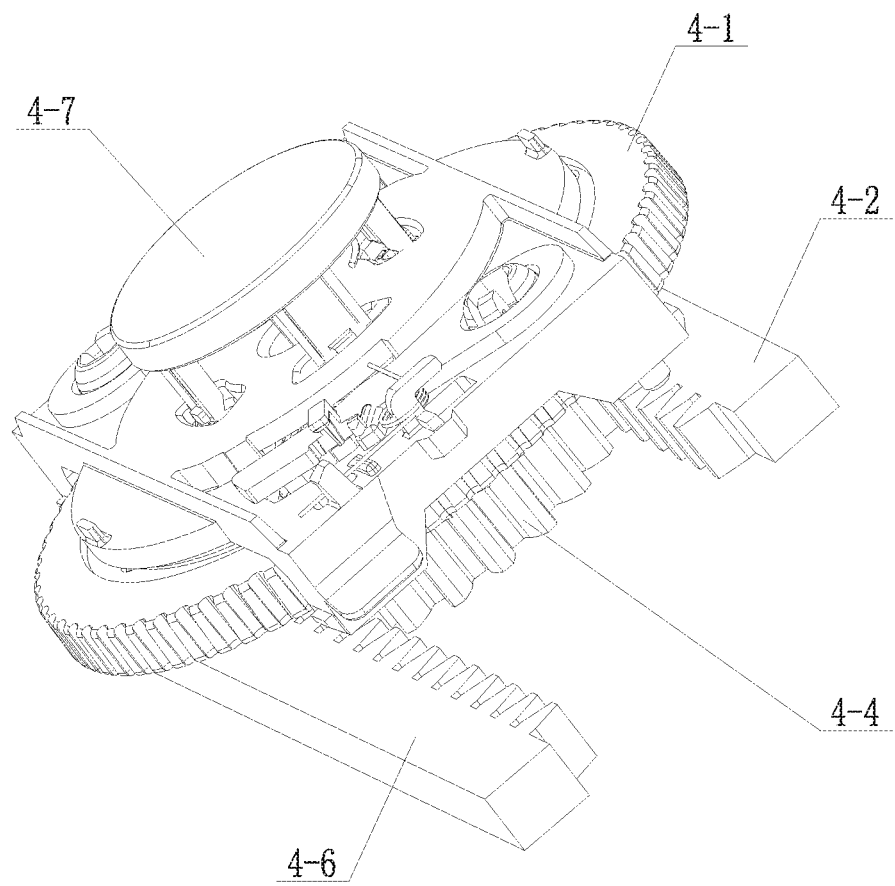
FIG. 8 is a perspective view of a regulating mechanism employed in a head-mounted resilient auxiliary locking mechanism according to some embodiments of the present disclosure.
Figure 9:
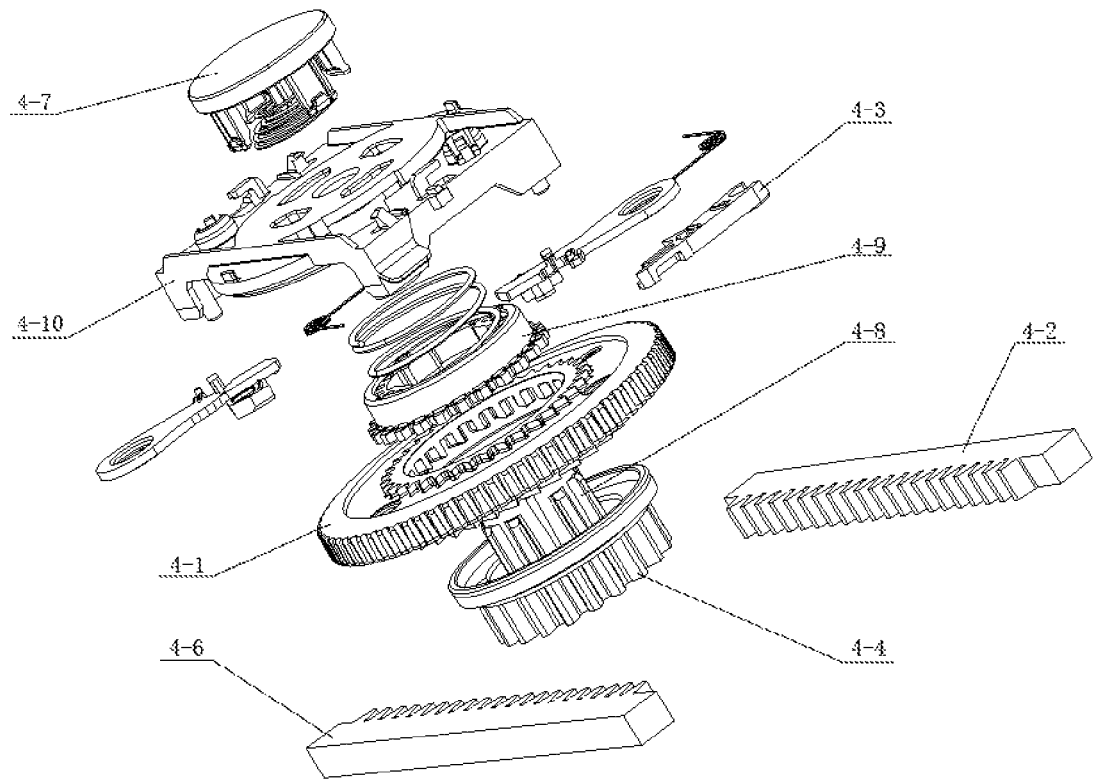
FIG. 9 is an exploded view of a regulating mechanism employed in a head-mounted resilient auxiliary locking mechanism according to some embodiments of the present disclosure.

As shown in FIGS. 7, 8 and 9, the locking module 4 is provided with a bracket 4-10, the bracket 4-10 is provided with a dial wheel 4-1, and is provided with a transmission gear 4-4 coaxial with the dial wheel 4-1, and the racks 4-2, 4-6 are respectively located above and below the transmission gear 4-4 and engaged with the transmission gear 4-4, the rotation of the dial wheel 4-1 drives the transmission gear 4-4 to rotate, and in turn drives the racks 4-2, 4-6 to move; and a side surface of the dial wheel 4-1 is provided with a ratchet 4-5, the bracket 4-10 is provided with a pawl 4-3, and the ratchet 4-5 and the pawl 4-3 cooperate to prevent the dial wheel 4-1 from reversely rotating.

The locking module 4 is mounted in the rear housing 1, and merely the dial wheel 4-1 is partially exposed, as shown in FIG. 1.

A clutching gear 4-9 is provided coaxially between the dial wheel 4-1 and the transmission gear 4-4, to drive the clutching gear 4-9 to axially displace, to connect or disconnect the transmission between the dial wheel 4-1 and the transmission gear 4-4.

As shown in FIG. 9, a transmission shaft 4-8 is provided between the dial wheel 4-1 and the transmission gear 4-4, the transmission shaft 4-8 is fixedly connected to the transmission gear 4-4, the transmission shaft 4-8 and the clutching gear 4-9 are matched by a spline, the clutching gear 4-9 can shift up and down reciprocatedly on the transmission shaft 4-8, and the dial wheel 4-1 is provided with transmission teeth engaged with the clutching gear 4-9.

The bracket 4-10 is provided with a button 4-7, the clutching gear 4-9 is pushed by using the button 4-7 to displace, and the clutching gear 4-9 is connected to a returning spring. The button 4-7 may also be provided with a returning spring.

In some embodiments, the dial wheel 4-1 merely rotates unidirectionally; when the transmission between the dial wheel 4-1 and the transmission gear 4-4 is connected, the transmission gear 4-4 maintains equidirectional unidirectional rotation; and when the transmission between the dial wheel 4-1 and the transmission gear 4-4 is disconnected, the transmission gear 4-4 rotates freely.

In some embodiments, the dial wheel 4-1, when rotating unidirectionally contracts the connecting band 3.

The Second Embodiment

Figure 10:
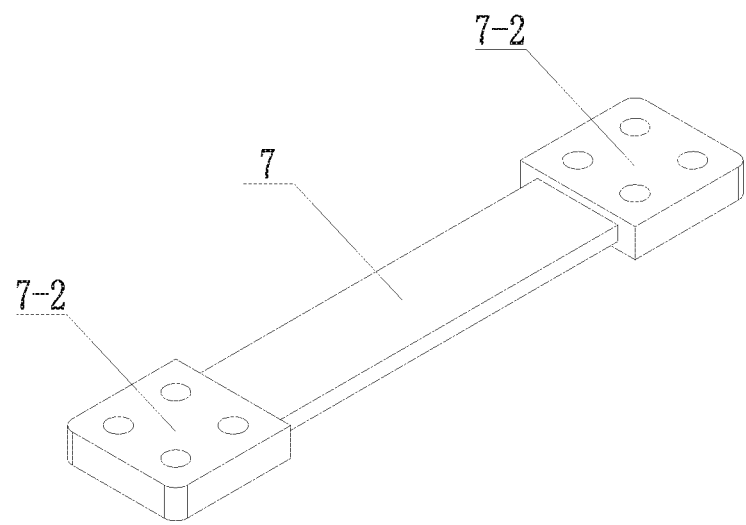
FIG. 10 is a perspective view of a resilient band employed in a head-mounted resilient auxiliary locking mechanism according to some embodiments of the present disclosure.

In some embodiments, as shown in FIG. 10, each end of the resilient band 7 is provided with a connecting terminal 7-2, and the connecting terminal 7-2 is provided with a plurality of fixing holes and are fixed respectively on the connecting band 3 and the rear housing 1 by a screw. In order to ensure the connection strength, the connecting terminal 7-2 preferably has increased thickness and width. The resilient band 7 may employ silica gel, and may also employ other materials that have elasticity, such as rubber.

Such a design can eliminate the buckles, and simplifies the mounting structure of the resilient band 7.

The Third Embodiment

Figure 11:
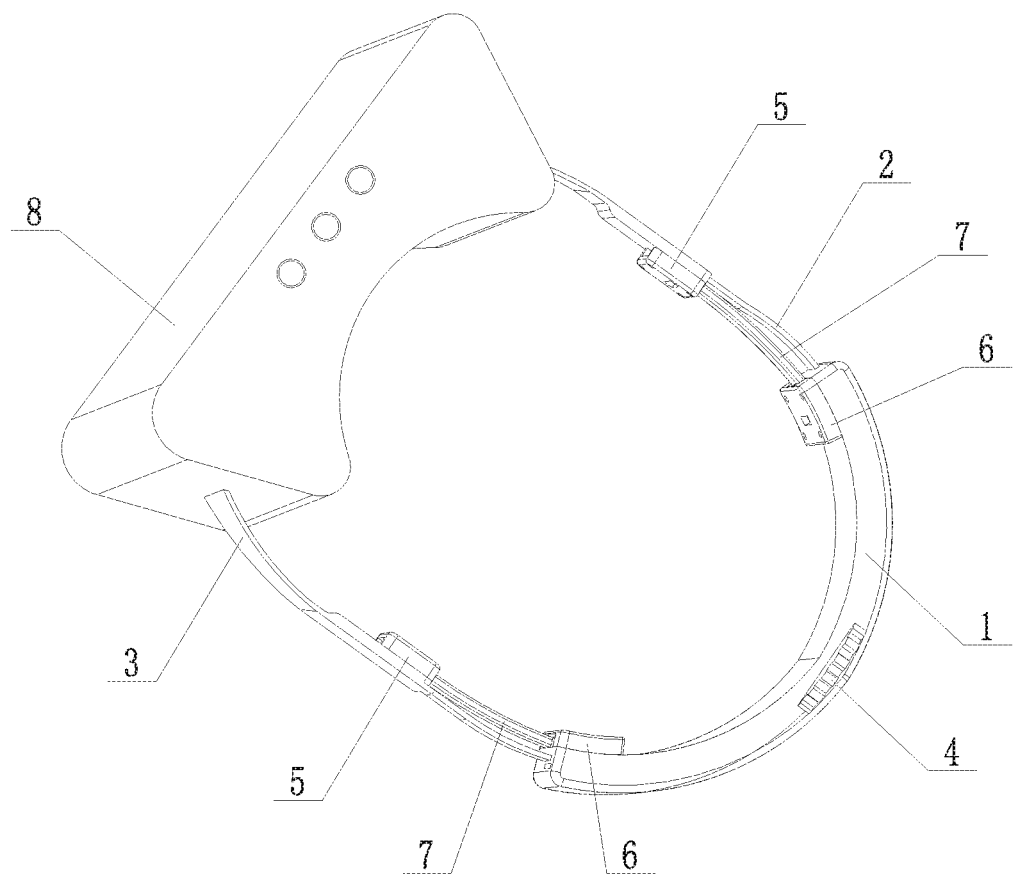
FIG. 11 is a perspective view of a head-mounted display according to some embodiments of the present disclosure.

FIG. 11 shows an embodiment of a head-mounted display according to the present disclosure. In the present embodiment, a head-mounted display comprises a display 8 and the head-mounted resilient auxiliary locking mechanism, the head-mounted resilient auxiliary locking mechanism is provided with a connecting band 3, and the front part of the connecting band 3 is connected to the display 8. The front part of the connecting band 3 shown in FIG. 11 is connected to the two sides of the display 8, and certainly, according to the demand, the front part of the connecting band 3 may also be connected to the top part or upper part of the display 8. A rear housing 1 is provided at the rear of the connecting band 3, a locking module 4 is provided in the rear housing 1, racks 2 are provided at the two ends of the connecting band 3 connected to the rear housing 1, and the racks 2 are inserted into the rear housing to engage with the locking module 4. A resilient band 7 is connected between the connecting band 3 and the rear housing 1. When the locking module 4 locks the racks 2, the resilient band 7 prevents the engaging between the racks 2 and the locking module 4 from loosing; and when the locking module 4 releases the racks 2, the resilient band 7 drives the racks 2 to return.

In some embodiments, as shown in FIGS. 4-6 and 11, each of the connecting band 3 and the rear housing 1 is fixedly attached with a buckle, i.e., the front buckle 5 and the rear buckle 6 in the drawings, and the front buckle 5 and the rear buckle 6 individually fix one end of the resilient band 7.

In that, each end of the resilient band 7 has a claw 7-1, the front buckle 5 is provided with a matching clipping hole 5-2, the rear buckle 6 is provided with a matching clipping hole 6-2, the claw 7-1 of one end of the resilient band 7 protrudes into the front buckle 5 and is clip-connected with the clipping hole 5-2, and the claw 7-1 of the other end of the resilient band 7 protrudes into the rear buckle 6 and is clip-connected with the clipping hole 6-2. The front buckle 5 and the rear buckle 6 are respectively fixed on the connecting band 3 and the rear housing 1 by a screw.

In some embodiments, as shown in FIGS. 7-9, the locking module 4 is provided with a bracket 4-10, the bracket 4-10 is provided with a dial wheel 4-1, and is provided with a transmission gear 4-4 coaxial with the dial wheel 4-1, and the racks 4-2, 4-6 are respectively located above and below the transmission gear 4-4 and engaged with the transmission gear 4-4, the rotation of the dial wheel 4-1 drives the transmission gear 4-4 to rotate, and in turn drives the racks 4-2, 4-6 to move; and a side surface of the dial wheel 4-1 is provided with a ratchet 4-5, the bracket 4-10 is provided with a pawl 4-3, and the ratchet 4-5 and the pawl 4-3 cooperate to prevent the dial wheel 4-1 from reversely rotating.

A clutching gear 4-9 is provided coaxially between the dial wheel 4-1 and the transmission gear 4-4, to drive the clutching gear 4-9 to axially displace, to connect or disconnect the transmission between the dial wheel 4-1 and the transmission gear 4-4.

A transmission shaft 4-8 is provided between the dial wheel 4-1 and the transmission gear 4-4, the transmission shaft 4-8 is fixedly connected to the transmission gear 4-4, the transmission shaft 4-8 and the clutching gear 4-9 are matched by a spline, the clutching gear 4-9 can shift up and down reciprocatedly on the transmission shaft 4-8, and the dial wheel 4-1 is provided with transmission teeth engaged with the clutching gear 4-9.

In some embodiments, the bracket 4-10 is provided with a button 4-7, the clutching gear 4-9 is pushed by using the button 4-7 to displace, and the clutching gear 4-9 is connected to a returning spring. The button 4-7 may also be provided with a returning spring.

In the present embodiment, the dial wheel 4-1 merely rotates unidirectionally. When the transmission between the dial wheel 4-1 and the transmission gear 4-4 is connected, the transmission gear 4-4 maintains equidirectional unidirectional rotation; and when the transmission between the dial wheel 4-1 and the transmission gear 4-4 is disconnected, the transmission gear 4-4 rotates freely. Furthermore, the dial wheel 4-1, when rotating unidirectionally contracts the connecting band 3.

In other embodiments, as shown in FIG. 10, each end of the resilient band 7 is provided with a connecting terminal 7-2, and the connecting terminals 7-2 are provided with a plurality of fixing holes and are fixed respectively on the connecting band 3 and the rear housing 1 by a screw.

In the above embodiments, the resilient band 7 may employ silica gel, and may also employ other materials that have elasticity, such as rubber.

In conclusion, the head-mounted display, by using the head-mounted resilient auxiliary locking mechanism of some of the above embodiments, may have one or more the following advantages:

(1) In wearing experience it can be resiliently tensioned or strained, to increase the comfortableness.
(2) When the head wearing spacing is being regulated, it can be automatically returned, which facilitates the regulating.
(3) The resilient tensioning or straining prevents intertooth jumping, which prolongs the usage life.
(4) The silica gel band has reliable properties, has low cost, is easy to handle and is replaceable.
(5) The degree of tightness can be quickly regulated in head wearing virtual reality experiencing.

What is claimed is:

1. A head-mounted resilient auxiliary locking mechanism, wherein the mechanism comprises a connecting band, a rear housing provided at a rear of the connecting band, a locking module provided in the rear housing, racks provided at the two ends of the connecting band and inserted into the rear housing to engage with the locking module, and a resilient band connected between the connecting band and the rear housing;

when the locking module locks the racks, the resilient band prevents the engaging between the racks and the locking module from loosing; and when the locking module releases the racks, the resilient band drives the racks to return.

2. The head-mounted resilient auxiliary locking mechanism according to claim 1, wherein each of the connecting band and the rear housing is fixedly attached with a buckle, and the connecting band and the rear housing are respectively fixed to one end of the resilient band by the buckle.

3. The head-mounted resilient auxiliary locking mechanism according to claim 2, wherein each end of the resilient band has a claw, the buckles are provided with matching clipping holes; and the claws of the ends of the resilient band protrude into the buckles and clip-connected with the clipping holes, and the buckles are fixed respectively on the connecting band and the rear housing by a screw.

4. The head-mounted resilient auxiliary locking mechanism according to claim 1, wherein the locking module is provided with a bracket, the bracket is provided with a dial wheel, and is provided with a transmission gear coaxial with the dial wheel, and the racks are respectively located above and below the transmission gear and engaged with the transmission gear, the rotation of the dial wheel drives the transmission gear to rotate, and in turn drives the racks to move; and a side surface of the dial wheel is provided with a ratchet, the bracket is provided with a pawl, and the ratchet and the pawl cooperate to prevent the dial wheel from reversely rotating.

5. The head-mounted resilient auxiliary locking mechanism according to claim 4, wherein a clutching gear is provided coaxially between the dial wheel and the transmission gear, to drive the clutching gear to axially displace to connect or disconnect transmission between the dial wheel and the transmission gear.

6. The head-mounted resilient auxiliary locking mechanism according to claim 5, wherein a transmission shaft is provided between the dial wheel and the transmission gear, the transmission shaft is fixedly connected to the transmission gear, the transmission shaft and the clutching gear are matched by a spline, the clutching gear shifts up and down reciprocatedly on the transmission shaft, and the dial wheel is provided with transmission teeth engaged with the clutching gear.

7. The head-mounted resilient auxiliary locking mechanism according to claim 5, wherein the bracket is provided with a button, the clutching gear is pushed by using the button to displace, and the clutching gear is connected to a returning spring.

8. The head-mounted resilient auxiliary locking mechanism according to claim 5, wherein the dial wheel merely rotates unidirectionally; when the transmission between the dial wheel and the transmission gear is connected, the transmission gear maintains equidirectional unidirectional rotation; and when the transmission between the dial wheel and the transmission gear is disconnected, the transmission gear rotates freely.

9. The head-mounted resilient auxiliary locking mechanism according to claim 4, wherein the dial wheel merely rotates unidirectionally, and when the dial wheel rotating contracts the connecting band.

10. The head-mounted resilient auxiliary locking mechanism according to claim 1, wherein each end of the resilient band is provided with a connecting terminal, and the connecting terminals are provided with a plurality of fixing holes, and are fixed respectively on the connecting band and the rear housing by a screw.

11. A head-mounted display, comprises a display and a head-mounted resilient auxiliary locking mechanism; the head-mounted resilient auxiliary locking mechanism is provided with a connecting band, a front part of the connecting band is connected to the display, and a rear housing is provided at a rear of the connecting band; and a locking module is provided in the rear housing, two ends of the connecting band connected to the rear housing have racks, and the racks are inserted into the rear housing to engage with the locking module; a resilient band is connected between the connecting band and the rear housing; when the locking module locks the racks, the resilient band prevents the engaging between the racks and the locking module from loosing; and when the locking module releases the racks, the resilient band drives the racks to return.

12. The head-mounted display according to claim 11, wherein each of the connecting band and the rear housing is fixedly attached with a buckle, and the connecting band and the rear housing are respectively fixed to one end of the resilient band by the buckle.

13. The head-mounted display according to claim 12, wherein each end of the resilient band has a claw, the buckles are provided with matching clipping holes, the claws of the ends of the resilient band protrude into the buckles and clip-connected with the clipping holes, and the buckles are fixed respectively on the connecting band and the rear housing by a screw.

14. The head-mounted display according to claim 11, wherein the locking module is provided with a bracket, the bracket is provided with a dial wheel, and is provided with a transmission gear coaxial with the dial wheel, and the racks are respectively located above and below the transmission gear and engaged with the transmission gear, rotate the dial wheel to drive the transmission gear to rotate, and in turn drive the racks to move; and a side surface of the dial wheel is provided with a ratchet, the bracket is provided with a pawl, and the ratchet and the pawl cooperate to prevent the dial wheel from reversely rotating.

15. The head-mounted display according to claim 14, wherein a clutching gear is provided coaxially between the dial wheel and the transmission gear, to drive the clutching gear to axially displace to connect or disconnect transmission between the dial wheel and the transmission gear.

16. The head-mounted display according to claim 15, wherein a transmission shaft is provided between the dial wheel and the transmission gear, the transmission shaft is fixedly connected to the transmission gear, the transmission shaft and the clutching gear are matched by a spline, the clutching gear shifts up and down reciprocatedly on the transmission shaft, and the dial wheel is provided with transmission teeth engaged with the clutching gear.

17. The head-mounted display according to claim 15, wherein the bracket is provided with a button, the clutching gear is pushed by using the button to displace, and the clutching gear is connected to a returning spring.

18. The head-mounted display according to claim 15, wherein the dial wheel merely rotates unidirectionally; when the transmission between the dial wheel and the transmission gear is connected, the transmission gear maintains equidirectional unidirectional rotation; and when the transmission between the dial wheel and the transmission gear is disconnected, the transmission gear rotates freely.

19. The head-mounted display according to claim 14, wherein the dial wheel merely rotates unidirectionally, and when rotating contracts the connecting band.

20. The head-mounted display according to claim 11, wherein each end of the resilient band is provided with a connecting terminal, and the connecting terminals are provided with a plurality of fixing holes, and are fixed respectively on the connecting band and the rear housing by a screw.

* * * * *